United States Patent [19]

Buttriss

[11] 4,047,268
[45] Sept. 13, 1977

[54] WORM GEAR CLAMPING APPARATUS
[75] Inventor: A. T. Buttriss, Fairview Park, Ohio
[73] Assignee: Eaton Corporation, Cleveland, Ohio
[21] Appl. No.: 651,082
[22] Filed: Jan. 21, 1976
[51] Int. Cl.$^2$ .............................................. B65D 63/00
[52] U.S. Cl. ................................. 24/274 R; 24/16 PB
[58] Field of Search ............................. 24/274, 16 PB

[56] References Cited
U.S. PATENT DOCUMENTS

| 3,757,394 | 9/1973 | Turner | 24/274 R |
| 3,924,299 | 12/1975 | McCormick | 24/16 PB |

Primary Examiner—Paul R. Gilliam
Assistant Examiner—Victor N. Sakran
Attorney, Agent, or Firm—Teagno & Toddy

[57] ABSTRACT

A worm gear clamping apparatus including a molded, one-piece worm gear drive head and strap assembly, the end of the strap oppositely disposed from the worm gear drive head defining partial internal threads on its outward surface. The apparatus also includes a molded worm member having external threads and an elongated guide portion projecting forwardly of the threads. The worm gear drive head defines a strap-receiving opening for receiving the opposite end of the strap, and also defines a worm chamber configured to receive the external threads of the worm member. The forward end of the worm gear drive head defines a journal opening for receiving the elongated guide portion axially movable therein. The worm gear drive head also includes a sloped, rearward surface, and the elongated guide portion of the worm member is long enough that when the worm member is moved to its rearwardmost position, it may be pivoted, disengaging the external threads from the partial internal threads and permitting free axial movement of the strap member relative to the worm gear drive head.

9 Claims, 8 Drawing Figures

WORM GEAR CLAMPING APPARATUS

BACKGROUND OF THE DISCLOSURE

The present invention relates generally to a clamping device, and more particularly, to a flexible, encircling, clamping apparatus of the worm gear type.

Worm gear clamping devices, such as those disclosed in U.S. Pat. Nos. 3,371,392 and 3,521,334, are widely used because they offer certain advantages over spring-type clamping devices or other types of clamping devices which are applicable to only a relatively narrow range of diameters. For example, worm gear clamping devices are more convenient to use, do not require special tools for installation and removal, and allow readjustment of the clamping forces.

However, the prior art worm gear clamping devices also involve some disadvantages. One of the problems arising with the use of the early worm gear clamping devices has been corrosion, because these devices have usually utilized metal components, and any such corrosion interferes with the removal of the clamping device. More recently, worm gear clamping devices have utilized molded plastic components; see, for example, the clamping device disclosed in U.S. Pat. No. 3,914,832, assigned to the assignee of the present invention. Therefore, although it will become apparent subsequently that the clamping device of the present invention may utilize metal components, the invention advantaeously uses molded plastic components, and will be described as such.

A common disadvantage of the prior art worm gear clamping devices is that they have generally been too complicated, too difficult to assemble, or both. By difficult to assemble, it is meant that with most such devices it has been necessary to insert the free end of the strap into the worm gear drive head, and into engagement with the worm member and from there, reduce the diameter of the clamping device all the way to the point where it begins to clamp by turning the worm member, such as by means of a screwdriver or wrench. It will be apparent that the time required to thread a substantial length of the strap through the worm gear drive head by turning the worm member may prevent the use of such clamping devices from being economically feasible where a large number of such installation operations are required.

One alternative to eliminate the need for threading a long length of the strap is to fabricate the clamping device with a larger variety of strap lengths, which inroduces additional expense and/or inventory problems.

SUMMARY OF THE INVENTION

Accordingly, it is an object of the present invention to provide a flexible, encircling clamping device of the worm gear type which is of a relatively simple construction, requires no more than two separate parts, and is adapted to the use of molded plastic components.

It is another object of the present invention to provide a worm gear clamping device which achieves the above-stated objects, and which makes it possible to insert the free end of the strap through the worm gear drive head, until the clamping device is reduced to nearly the desired diameter, without the necessity of turning the worm member to move the strap.

It is a more specific object of the present invention to provide a worm gear clamping device which achieves the preceding object by permitting the threaded portion of the worm member to be withdrawn from the worm gear drive head, and out of threaded engagement with the internal threads defined by the strap, to permit the strap to move freely through the worm gear drive head.

The above and other objects of the present invention are accomplished by the provision of an improved worm gear clamping device which includes a worm gear drive head, a flexible strap member, and a worm member. One end of the strap member is attachable to the drive head and the outward surface of the strap defines partial internal threads adjacent the opposite end. The worm member has external threads and an elongated guide portion projecting forwardly thereof. The worm gear drive head defines an opening for receiving the free end of the strap and a worm chamber for receiving the external threads of the worm member. The drive head also includes a forward wall defining a journal opening, receiving the elongated guide portion therein, and the guide portion includes a stop for limiting normal rearward movement of the worm relative to the journal opening.

The worm member defines an assembled position relative to the drive head with the external threads disposed within the worm chamber and in meshing engagement with the partial internal threads. In this position, axial movement of the strap relative to the drive head may be effected only by rotation of the worm member. The worm also defines a pre-assembled position relative to the drive head with the stop portion disposed adjacent the forward wall, the guide portion disposed within the worm chamber and the external threads disposed rearwardly of the drive head. In this position the worm member may be pivoted away from the strap, disengaging the external threads from the internal threads to permit free axial movement of the strap relative to the drive head.

A BRIEF DESCRIPTION OF THE DRAWINGS

FIG. 1 is a fragmentary view, partly in elevation and partly in cross section, illustrating the clamping device of the present invention installed on a hose or the like.

DESCRIPTION OF THE PREFERRED EMBODIMENT

Figure 1:
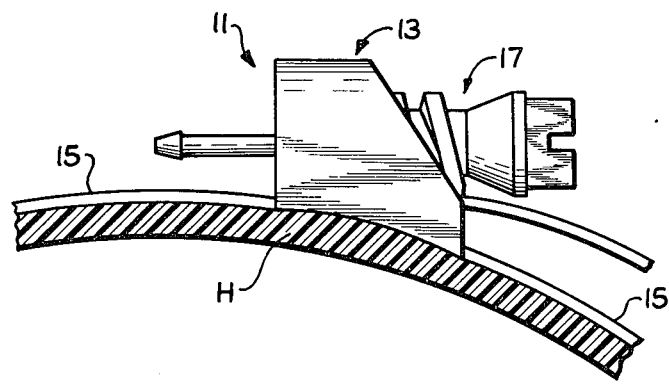

Referring now to the drawings, which are not intended to limit the present invention, FIG. 1 is a fragmentary view illustrating a worm gear clamping device, generally designated 11, encircling a plastic hose H. The clamping device 11 includes a worm gear drive head, generally designated 13, a flexible strap member generally designated 15, and a worm gear 17. These components are shown and described in greater detail in FIGS. 2, 3, and 4.

Figure 2:
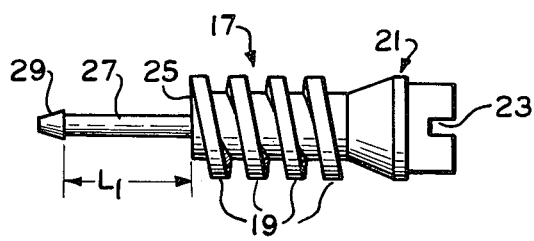
FIG. 2 is an elevation of the worm member utilized with the present invention.

Referring to FIG. 2, it may be seen that the worm gear 17 includes a set of external threads 19, and at the rearward end of the worm gear 17 there is a head portion 21 which, in the subject embodiment, defines a slot 23 such that the worm gear 17 may be rotated by means of a screwdriver. It will be appreciated by those skilled in the art that the head portion 21 may have various other configurations, or combinations thereof, which permit turning of the worm gear 17 by means of any common tool such as a screwdriver or wrench, or if desired, by means of a special tool to minimize tampering with the clamping device once it is installed. Therefore, it should be appreciated that the particular configuration of the head portion 21 forms no part of the present invention.

At the forward end of the set of external threads 19 there is a forward, transverse wall 25, and projecting forwardly from the transverse wall 25 is an elongated guide portion 27 which, preferably, has a circular cross section. The elongated guide portion 27 is illustrated in FIG. 2 as having an axial length $L_1$, the significance of which will be described subsequently. At the forward end of the guide portion 27 is a stop member 29, the function of which will also be described subsequently, but which is generally dart-shaped.

Figure 3:
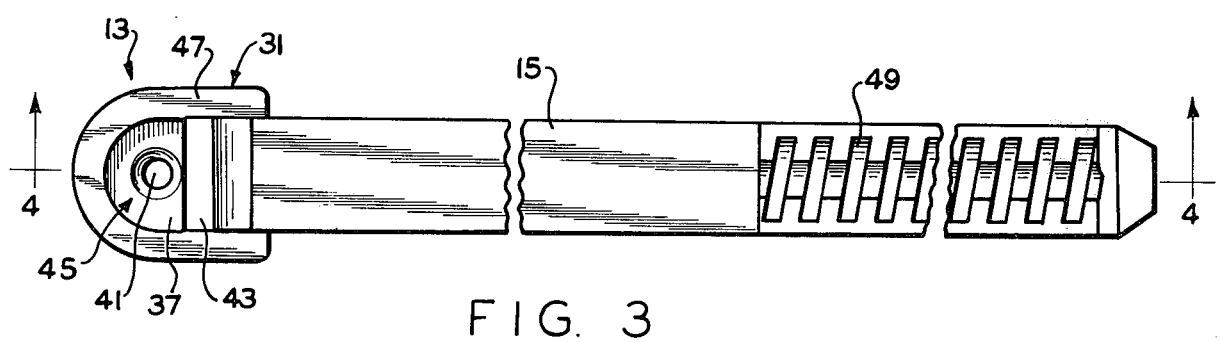
FIG. 3 is a broken, front elevation of the one-piece worm gear drive head and strap assembly in the "as molded" condition.
Figure 4:
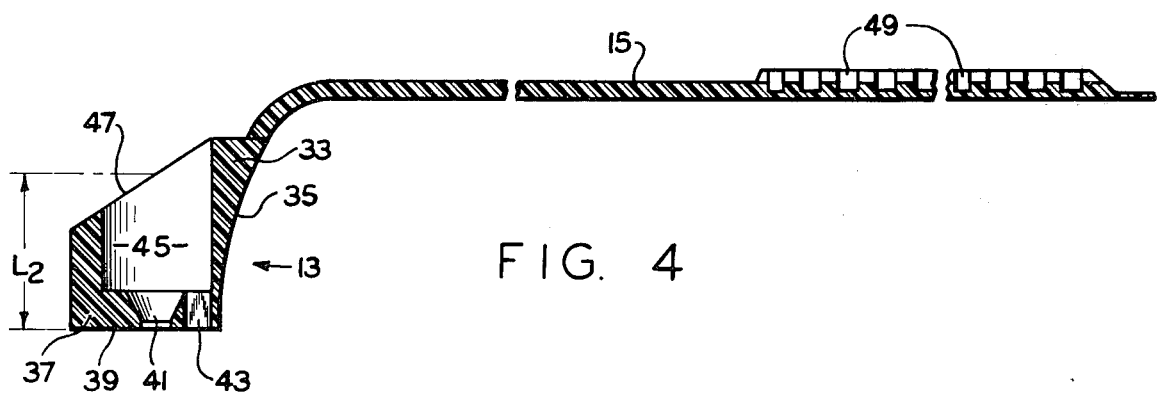
FIG. 4 is a cross section, taken on line 4—4 of FIG. 3.

Referring now to FIGS. 3 and 4, the worm gear drive head 13 and strap member 15 are shown as a one-piece molding, and although this is generally desirable, it will be appreciated that within the scope of the present invention, the drive head 13 and strap 15 may be formed separately and joined prior to installation of the clamping device.

The worm gear drive head 13 includes a generally U-shaped outer wall 31 (see FIG. 3), the end portions of which are formed integrally with a bottom wall 33 (see FIG. 4), which defines a curved bottom surface 35 to conform generally to the curved surface of the hose H. At the forward end of the drive head 13, and preferably formed integrally outer wall 31 and bottom wall 33, is a forward wall 37. The forward wall 37 includes a forward surface 39 and defines a journal opening 41 which is preferably circular and of large enough diameter to permit the elongated guide portion 27 to move axially relative to the journal opening 41. The journal opening 41 is preferably sized for snap-in receipt of the dart-shaped stop member 29. The forward wall 37 also defines an opening 43 which receives the strap member 15 and permits it to move axially relative to the drive head 13. The outer wall 31, bottom wall 33, and forward wall 37 cooperate to define a chamber 45, which receives the set of external threads 19 of the worm gear 17 when the clamping device 11 is installed as in FIG. 1. At the rearward end of the drive head 13, the U-shaped outer wall 31 includes a rearward surface 47 which, as is best seen in FIG. 4, cooperates with the axis of the chamber 45 to define an acute included angle, preferably in the range of about thirty degrees to about sixty degrees, and which, in the subject embodiment, is about forty degrees. This sloped, rearward surface 47 is an important feature of the present invention for reasons which will be described subsequently.

Although the worm gear 17 is shown in FIG. 2 as being separate from the assembly of the drive head 13 and strap 15 shown in FIGS. 3 and 4, it should be understood that, within the scope of the present invention, it may be desirable to mold the worm gear 17 integral with the drive head and strap assembly. This may be accomplished, for example, by molding a frangible web integrally connecting the stop member 29 and forward wall 37 as is generally well-known in the art.

Figure 5:
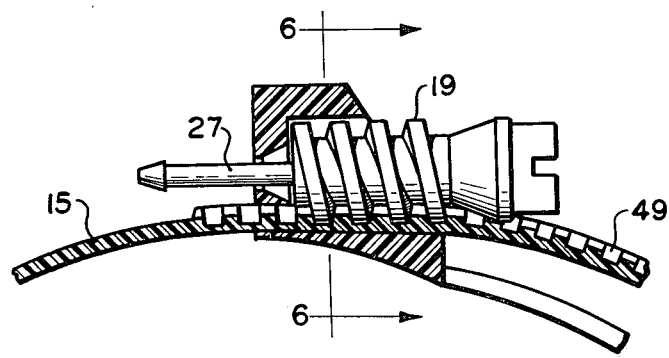
FIG. 5 is a transverse cross section of the clamping device of the present invention in the assembled position.

Referring now to FIGS. 5, 6, 7 and 8, there is illustrated the installation and use of the clamping device 11. In FIG. 5 the clamping device is shown in its assembled position, with a majority of the external threads 19 disposed within the chamber 45, and also in meshing engagement with the partial internal threads 49. It should be appreciated that the size of the chamber 45, relative to the size of the threads 19, should be such that the worm 17 can rotate freely within the chamber 45 (see FIG. 6), whereas the clearance between the threads 19 and the inner surface of the drive head 13 should be sufficiently small to prevent the worm gear 17 from rising within the chamber 45 while the clamping device is being tightened, which would permit the external threads 19 to become partially disengaged from the internal threads 49. In the assembled position of FIG. 5, the transverse wall 25 of the worm gear 17 is normally in engagement with the rear surface of forward wall 37, although a slight space is shown therebetween for purposes of clarity in FIG. 5. It should be apparent that, in the assembed position shhown in FIG. 5, the clamping device of the present invention operates in a manner similar to the prior art devices, i.e., if the worm gear 17 is rotated clockwise (when viewed from the right in FIG. 5), the strap 15 will be pulled through the drive head 13, toward the right in FIG. 5, thus reducing the diameter defined by the strap 15, and exerting an increasing clamping force.

Figure 7:
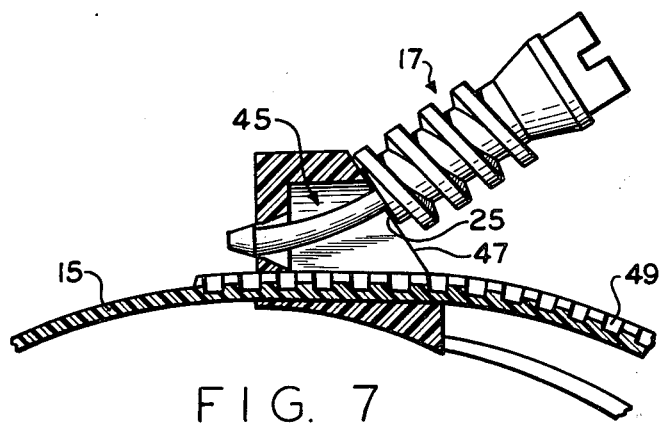
FIG. 7 is a transverse cross section similar to FIG. 5, illustrating the clamping device of the present invention in the pre-assembled position.
Figure 6:
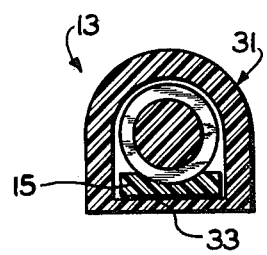
FIG. 6 is a cross section taken on line 6—6 of FIG. 5.

Referring now to FIG. 7, the clamping device of the present invention is shown in its pre-assembled position. This position is achieved as follows: the worm gear 17 is retracted or withdrawn from the chamber 45 to its rearwardmost position in which the stop portion 29 engages the forward surface 39 of forward wall 37, thus limiting the rearward (to the right in FIG. 7) movement of the worm gear 17. With the worm gear 17 in the above-described axial portion, it is pivoted to the position shown in FIG. 7 with transverse wall 25 of the worm gear 17 in engagement with the rearward surface 47 of the drive head 13. The significance of the length $L_1$ of elongated guide portion 27 and of length $L_2$ of the drive head 13 may now be better understood. Preferably, the lengths $L_1$ and $L_2$ are approximately equal, such that the worm gear 17 may be pivoted to the position shown in FIG. 7.

With the worm gear 17 pivoted for the position shown in FIG. 7, it is possible to insert the free end of the strap 15 into opening 43 of the worm gear drive head 13 and slide the strap axially through the drive head 13 until the diameter defined by the strap 15 is approximately equal to the diameter of the object being clamped, or in other words, the strap member 15 is loosely engaging the object being clamped.

Figure 8:
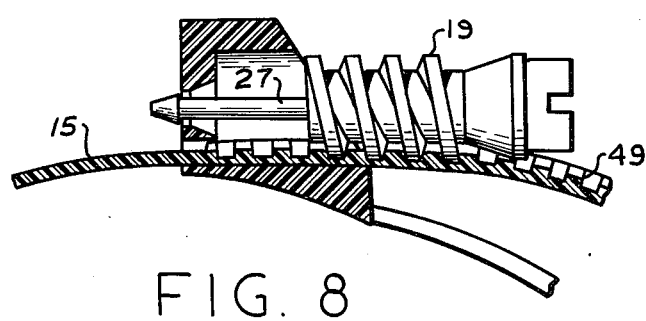
FIG. 8 is a transverse cross section similar to FIGS. 5 and 7, illustrating the clamping device of the present invention just before it is moved to the assembled position of FIG. 5.

The clamping device 11 is now in the pre-assembled position and the worm gear 17 may be pivoted toward the strap 15 until the external threads 19 are in engagement with the internal threads 49 (see FIG. 8). With the threads in meshing engagement, so that the strap 15 and worm gear 17 move together, the worm gear 17 is then inserted into the chamber 45, to the position shown in FIG. 5. This axial movement of the strap 15 and worm gear 17 has the effect of slightly loosening the strap, but, if the device is properly installed, only a few turns of the worm gear 17 will be needed to achieve the desired tightness of the strap 15 about the object being clamped.

Thus, it may be seen that the clamping device 11 of the present invention provides a simple encircling, clamping device of the worm gear type which may be installed quickly and easily to the pre-assembled position shown in FIG. 7, with only a few turns of the worm gear required to achieve the desired clamping force, regardless of the length of the internally threaded portion 49 which must pass through the worm gear drive head before tightening is achieved.

I claim:

1. A flexible, encircling, clamping apparatus comrpising:
   a. a worm gear drive head;
   b. a flexible strap member having a first end adapted to be attached to said worm gear drive head and a second end, said strap member having an inward side and an outward side, said outward side having a portion adjacent said second end defining partial internal threads;
   c. worm member having external threads, threadably engageable with said internal threads, over a portion of its length, a flexible elongated guide portion projecting forwardly thereof; and means disposed at the rearward end thereof for rotating said worm member;
   d. said worm gear drive head defining a strap-receiving opening extending axially therethrough for receiving said second end of said strap member;
   e. said worm gear drive head defining a worm chamber adapted to receive said external threaded portion of said worm member rotatably disposed therein said worm chamber having a clearance with said worm when said worm is engaged with said partial internal threads of said second end within said chamber allowing rotation of said worm but preventing radial movement of said worm relative to said chamber sufficient to cause said worm to disengage from said partial internal threads;
   f. said worm gear drive head including a forward wall portion defining a journal opening adapted to receive said elongated guide portion axially movable therein, said guide portion including a stop portion for limiting normal rearward axial movement of said guide portion relative to said journal opening;
   g. said worm member defining an assembled position relative to said worm gear drive head with said external threads disposed within said worm chamber and in meshing engagement with said partial internal threads; and
   h. said worm member defining a pre-assembled position relative to said worm gear drive head with said stop portion disposed adjacent said forward wall, said guide portion disposed within said worm chamber and said external threads disposed rearwardly of said worm gear drive head to permit said worm member to be pivoted away from said strap member, disengaging said external threads from said partial internal threads and permitting free axial movement of said strap member relative to said worm gear drive head.

2. A clamping apparatus as claimed in claim 1 wherein said worm gear drive head has a length L measured along the axis of said worm chamber, said elongated guide portion has a length approximately equal to said length L, said worm chamber has an axial extension approximately equal to said length L and said length L is greater than twice the pitch of the worm.

3. A flexible, encircling, clamping apparatus, comprising:
   a. a one-piece, molded worm gear drive head and strap assembly, said strap having a first end integral with said worm gear drive head and having a free end, said strap including an outward surface defining partial internal threads;
   b. a one-piece, molded worm member having external threads adapted to engage said partial internal threads, said worm member including means disposed at the rearward end thereof to effect rotation of said worm member, an elongated flexible guide portion projecting forwardly of said external threads, and a stop portion disposed at the forward end of said elongated guide portion;
   c. said worm gear drive head defining
      i. a strap receiving opening for receiving said free end of said strap;
      ii. a worm chamber configured to receive said external threads of said worm member rotatably disposed therein, said worm chamber having a clearance with said worm when said worm is engaged with the partial external threads on said strap within said chamber allowing rotation of said worm but preventing radial movement of said worm relative to said chamber sufficient to cause a disengagement of said worm and said partial external threads, said chamber, said guide portion and said externally threaded portion being of substantially equal axial lengths;
      iii. a journal opening for receiving said elongated guide portion axially movable therein;
      iv. an external, rearward surface cooperating with the axis of said worm chamber to define an included angle of between about thirty degrees and about sixty degrees;
   d. said worm member and said worm gear drive head defining a pre-assembled position with said elongated guide portion in its rearwardmost orientation, with said stop portion disposed adjacent said journal opening, said worm member being pivotable away from said strap to disengage said external threads from said partial internal threads and permit free axial movement of said strap relative to said worm gear drive head.

4. A clamping apparatus as claimed in claim 3 wherein said worm member includes a transverse wall extending from said elongated guide portion to said external threads, said transverse wall and said rearward surface of said worm gear drive head being disposed generally parallel, and slightly spaced apart, in said pre-assembled position.

5. A clamping apparatus as claimed in claim 3 wherein said worm gear drive head and strap assembly and said worm member are molded as an integral unit with a frangible member connecting said head and strap assembly and said worm member.

6. A flexible, encircling, clamping apparatus, comprising:
   a. a one-piece, molded worm gear drive head and strap assembly, said strap having a first end integral with said worm gear drive head and a second end, said strap including an outward surface defining partial internal threads;
   b. a one-piece, molded worm member having external threads adapted to engage said partial internal threads, said worm member including means disposed at the rearward end thereof to effect rotation of said worm member, an elongated flexible guide portion projecting forwardly of said external threads, and a transverse wall extending from said elongated guide portion to said external threads;
c. said worm gear drive head defining
  i. a strap-receiving opening for receiving said second end of said strap;
  ii. a worm chamber configured to receive said external threads of said worm member rotatably disposed therein;
  iii. a journal opening for receiving said elongated guide portion axially movable therein;
  iv. an external, rearward surface disposed at an acute angle relative to the axis of said worm chamber;
  v. said worm chamber having a clearance with said worm member when said worm member is engaged with said partial internal threads of said second end within said chamber allowing rotation of said worm but preventing radial movement of said worm relative to said chamber sufficient to cause said worm to disengage from said partial threads;
d. said worm member and said worm gear drive head defining a pre-assembled position with said elongated guide portion in its rearwardmost orientation relative to said journal opening and said transverse wall of said worm member in engagement with said rearward surface of said worm gear drive head to disengage said external threads from said partial internal threads and permit free axial movement of said strap relative to said worm gear drive head.

7. A clamping apparatus as claimed in claim 6 wherein said rearward surface and said axis of said worm chamber define an included angle of about thirty degrees to about sixty degrees.

8. A clamping apparatus as claimed in claim 6 wherein said worm gear drive head and strap assembly and said worm member are molded with a frangible member connecting said worm member and said worm gear drive head.

9. A clamping apparatus as claimed in claim 7, wherein said guide portion, said externally threaded portion and said worm chamber are of substantially equal axial length, said axial length being greater than twice the pitch of the worm member.

* * * * *

UNITED STATES PATENT AND TRADEMARK OFFICE
CERTIFICATE OF CORRECTION

PATENT NO. : 4,047,268
DATED : Sept. 13, 1977
INVENTOR(S) : A.T.Buttriss

It is certified that error appears in the above-identified patent and that said Letters Patent are hereby corrected as shown below:

| | |
|---|---|
| Col. 1, line 23: | "More recently---" begins a new paragraph. |
| line 29: | "advantageously" is misspelled. |
| line 51: | "introduces" is misspelled. |
| Col. 3, line 42: | After "integrally" insert "with". |
| Col. 4, line 26: | "shown" is misspelled. |
| line 42: | "portion" should read "position". |
| Col. 5, line 22: | "a" omitted before "worm". |

Signed and Sealed this

Sixth Day of December 1977

[SEAL]

Attest:

RUTH C. MASON
*Attesting Officer*

LUTRELLE F. PARKER
*Acting Commissioner of Patents and Trademarks*